United States Patent
Clark et al.

(10) Patent No.: US 8,433,041 B2
(45) Date of Patent: Apr. 30, 2013

(54) METHOD AND SYSTEM TO ENABLE TOUCH-FREE INCOMING CALL HANDLING AND TOUCH-FREE OUTGOING CALL ORIGINATION

(75) Inventors: David William Clark, Carp (CA); Andrew James Weber, Ottawa (CA); Jeffrey William Dawson, Stittsville (CA); Sean M. Murray, Toronto (CA); Sanro Zlobec, Notre-Dame-de-l'Ile-Perrot (CA)

(73) Assignee: BCE Inc., Verdun, Quebec (CA)

( * ) Notice: Subject to any disclaimer, the term of this patent is extended or adjusted under 35 U.S.C. 154(b) by 1828 days.

(21) Appl. No.: 11/534,414

(22) Filed: Sep. 22, 2006

(65) Prior Publication Data

US 2007/0121815 A1    May 31, 2007

Related U.S. Application Data

(63) Continuation of application No. PCT/CA2005/001942, filed on Dec. 21, 2005, and a continuation-in-part of application No. PCT/CA2005/001456, filed on Sep. 23, 2005, and a continuation-in-part of application No. PCT/CA2005/001457, filed on Sep. 23, 2005.

(51) Int. Cl.
    *H04M 1/64* (2006.01)
(52) U.S. Cl.
    USPC ........ 379/88.01; 379/907; 704/231; 704/246; 340/5.52
(58) Field of Classification Search .... 379/88.01–88.04, 379/907; 455/563; 704/231, 246–250, E15.001–E15.007, E17.011; 340/5.52
    See application file for complete search history.

(56) References Cited

U.S. PATENT DOCUMENTS

| | | | |
|---|---|---|---|
| 6,021,177 A | 2/2000 | Allport | |
| 6,101,473 A | 8/2000 | Scott et al. | |
| 6,160,877 A | 12/2000 | Tatchell et al. | |
| 6,212,408 B1 * | 4/2001 | Son et al. | 455/563 |

(Continued)

FOREIGN PATENT DOCUMENTS

| | | |
|---|---|---|
| JP | 2001339504 A | 12/2001 |
| WO | WO 01/35620 A1 | 5/2001 |

OTHER PUBLICATIONS

Office Action mailed on Dec. 21, 2009 in connection with Canadian Patent Application 2,570,695.
PCT/CA2005/001456 (ISR), Jun. 1, 2006, BCE Inc.

(Continued)

*Primary Examiner* — Md S Elahee

(57) ABSTRACT

A system for enabling a user of a communication device to both handle an incoming call and originate an outgoing call without having to touch the communication device, by way of exchange of voice messages with the communication device. The system is operative for receiving a signal produced by a microphone associated with the communication device and for processing this signal in an attempt to detect at least one of a plurality of spoken commands potentially contained therein. The plurality of spoken commands comprises at least one spoken call handling command and at least one spoken call origination command. In response to detecting a spoken call handling command, the system causes handling of an incoming call destined for the communication device in accordance with the detected spoken call handling command. In response to detecting a spoken call origination command, the system causes an attempt to establish an outgoing call using the communication device in accordance with the detected spoken call origination command.

54 Claims, 9 Drawing Sheets

U.S. PATENT DOCUMENTS

| | | | |
|---|---|---|---|
| 6,438,216 | B1 | 8/2002 | Aktas |
| 6,505,163 | B1 | 1/2003 | Zhang et al. |
| 6,584,188 | B2 | 6/2003 | Kim |
| 6,631,179 | B1 | 10/2003 | Sifuentes |
| 6,633,846 | B1 | 10/2003 | Bennett et al. |
| 6,728,671 | B1 | 4/2004 | Johnson |
| 6,799,098 | B2 | 9/2004 | Horst et al. |
| 7,120,241 | B1 | 10/2006 | Fuoss et al. |
| 7,356,131 | B2 | 4/2008 | Bishop et al. |
| 7,437,148 | B1 | 10/2008 | Vaghi et al. |
| 2002/0067245 | A1 | 6/2002 | Campbell et al. |
| 2002/0168063 | A1 | 11/2002 | Williams |
| 2002/0193989 | A1 | 12/2002 | Geilhufe et al. |
| 2004/0066916 | A1* | 4/2004 | Brown et al. .............. 379/88.01 |
| 2010/0215039 | A1 | 8/2010 | Kent et al. |

OTHER PUBLICATIONS

PCT/CA2005/001457 (ISR), Jun. 29, 2006, BCE Inc.

PCT/CA2005/001942 (ISR), Jun. 29, 2006, BCE Inc.

OnStar, How Do I Use OnStar?, http://www.onstar.com/canada_english/jsp/explore/use_onstar.jsp, 2 pages.

Mobiletrax, Voice activated Services in Cell Phones: "Can You Understand Me Now?", Dec. 15, 2004, http://www.mobiletrax.com/im/2004archives/20041215.html, 3 pages.

Cartronics Inc., Verison Wireless, Keeping It Simple with the Kyocera KX444 PTT Phone, http://www.cartron.com/kyo_kx444.pdf, 5 pages.

Office Action issued by the United States Patent and Trademark Office on Dec. 10, 2010 in connection with U.S. Appl. No. 11/534,425, 19 pages.

Office Action issued by the United States Patent and Trademark Office on Dec. 20, 2010 in connection with U.S. Appl. No. 11/534,501, 17 pages.

Office Action issued on Jun. 19, 2012 in connection with U.S. Appl. No. 11/534,425, 18 pages.

* cited by examiner

METHOD AND SYSTEM TO ENABLE
TOUCH-FREE INCOMING CALL HANDLING
AND TOUCH-FREE OUTGOING CALL
ORIGINATION

CROSS-REFERENCE TO RELATED
APPLICATIONS

This application is a CONTINUATION, and claims the benefit under 35 U.S.C. 120, of PCT International Patent Application Serial No. PCT/CA2005/001942, filed on Dec. 21, 2005, designating the United States of America, and hereby incorporated by reference herein.

This application is a CONTINUATION-IN-PART, and claims the benefit under 35 U.S.C. 120, of PCT International Application No. PCT/CA2005/001456 filed on Sep. 23, 2005, designating the United States of America, and hereby incorporated by reference herein.

This application is also a CONTINUATION-IN-PART, and claims the benefit under 35 U.S.C. 120, of PCT International Application No. PCT/CA2005/001457 filed on Sep. 23, 2005, designating the United States of America, and hereby incorporated by reference herein.

FIELD OF THE INVENTION

The present invention relates generally to telephonic communication and, more specifically, to a method and a system for enabling a user of a communication device to handle an incoming call and originate an outgoing call without having to touch the communication device.

BACKGROUND OF THE INVENTION

Communication devices and telephony services have evolved to facilitate the manner in which users handle incoming calls and originate outgoing calls. For example, features such as calling line identification (CLID), call forwarding, call waiting, speed dialing, and busy call return all contribute to facilitating the handling of incoming calls and the origination of outgoing calls. In addition, wireless communication devices, such as mobile phones and cordless phones, allow incoming call handling and outgoing call origination while on the move.

Lamentably, conventional communication devices require users to touch or otherwise physically manipulate their devices (for example, by lifting a receiver of a phone, flipping a phone open, and/or interacting with a keypad) in order to handle incoming calls and originate outgoing calls. While physically manipulating a communication device in order to perform any of these two functions may represent only a slight nuisance for some users, for other users such as call center agents, receptionists, stock brokers, etc., this requirement may negatively impact their efficiency in a business environment. Just as significantly, physically manipulating a mobile phone while driving a vehicle in order to handle an incoming call or originate an outgoing call represents a distraction which may pose a safety hazard.

Thus, there is a need to further enhance the convenience with which incoming calls can be handled and outgoing calls can be originated.

SUMMARY OF THE INVENTION

According to a first broad aspect, the invention provides a method to enable touch-free incoming call handling and touch-free outgoing call origination with a communication device. The method comprises receiving at a network entity a signal indicative of sound sensed by a microphone associated with the communication device, the signal having been produced:
  as part of one of (i) an incoming call handling process associated with an incoming call destined for the communication device; and (ii) an outgoing call origination process associated with an outgoing call to be originated using the communication device; and
  without requiring the communication device to have been touched since a start of the one of the incoming call handling process and the outgoing call origination process.

The method also comprises processing the received signal in an attempt to detect at least one of a plurality of spoken commands potentially contained therein. The plurality of spoken commands comprises at least one spoken call handling command and at least one spoken call origination command. The method further comprises, responsive to detection of a specific one of the at least one spoken call handling command in the received signal, handling the incoming call associated with the incoming call handling process in accordance with the specific spoken call handling command; and, responsive to detection of a specific one of the at least one spoken call origination command in the received signal, attempting to establish the outgoing call associated with the outgoing call origination process in accordance with the specific spoken call origination command.

According to a second broad aspect, the invention provides a system for enabling touch-free incoming call handling and touch-free outgoing call origination using a communication device communicatively coupled to the system via a communications network. The system comprises a communication module operative for receiving a signal indicative of sound sensed by a microphone associated with the communication device, the signal having been produced:
  as part of one of (i) an incoming call handling process associated with an incoming call destined for the communication device; and (ii) an outgoing call origination process associated with an outgoing call to be originated using the communication device; and
  without requiring the communication device to have been touched since a start of the one of the incoming call handling process and the outgoing call origination process.

The system also comprises a speech recognition module operative for processing the received signal in an attempt to detect at least one of a plurality of spoken commands potentially contained therein. The plurality of spoken commands comprises at least one spoken call handling command and at least one spoken call origination command. The system further comprises a control module operative for, responsive to detection of a specific one of the at least one spoken call handling command in the received signal, causing handling of the incoming call associated with the incoming call handling process in accordance with the specific spoken call handling command; and, responsive to detection of a specific one of the at least one spoken call origination command in the received signal, causing an attempt to establish the outgoing call associated with the outgoing call origination process in accordance with the specific spoken call origination command.

According to a third broad aspect, the invention provides a computer readable storage medium containing a program element for execution by a functional unit of a network entity to enable touch-free incoming call handling and touch-free outgoing call origination using a communication device communicatively coupled to the network entity. The functional unit, when executing the program element, is operative for receiving a signal indicative of sound sensed by a microphone associated with the communication device, the signal having been produced:

as part of one of (i) an incoming call handling process associated with an incoming call destined for the communication device; and (ii) an outgoing call origination process associated with an outgoing call to be originated using the communication device; and without requiring the communication device to have been touched since a start of the one of the incoming call handling process and the outgoing call origination process.

The functional unit, when executing the program element, is also operative for processing the received signal in an attempt to detect at least one of a plurality of spoken commands potentially contained therein. The plurality of spoken commands comprises at least one spoken call handling command and at least one spoken call origination command. The functional unit, when executing the program element, is further operative for, responsive to detection of a specific one of the at least one spoken call handling command in the received signal, causing handling of the incoming call associated with the incoming call handling process in accordance with the specific spoken call handling command; and, responsive to detection of a specific one of the at least one spoken call origination command in the received signal, causing an attempt to establish the outgoing call associated with the outgoing call origination process in accordance with the specific spoken call origination command.

These and other aspects and features of the invention will now become apparent to those of ordinary skill in the art upon review of the following description of specific embodiments of the invention in conjunction with the accompanying drawings.

BRIEF DESCRIPTION OF THE DRAWINGS

A detailed description of certain embodiments of the invention is provided herein below, by way of example only, with reference to the accompanying drawings.

In the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
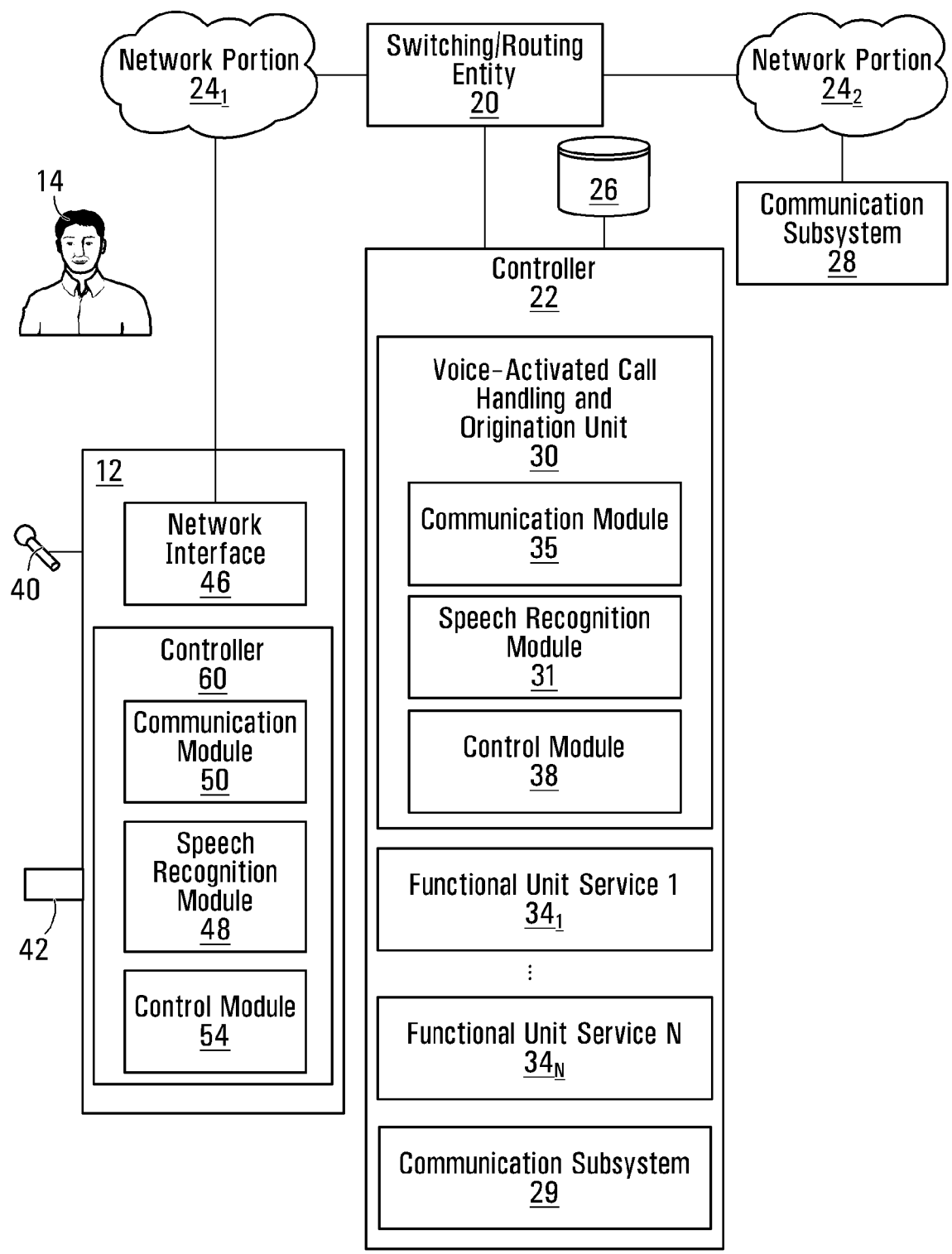
FIG. 1 shows, in schematic form, a communication device, a controller, a database and other components of a system for enabling a user of the communication device to handle an incoming call and originate an outgoing call without touching the communication device, in accordance with a non-limiting embodiment of the present invention.

FIG. 1 depicts a communication device 12 that may be employed by a user 14 to effect various call handling and call origination activities, including but not limited to handling an incoming call originating from a calling party device, placing an outgoing call to a called party device, and dialing-in to a server to check voice mail messages. By way of several non-limiting examples, the communication device 12 may be implemented as a wired Plain Old Telephony System (POTS)-enabled phone (including a cordless phone), a wireless-enabled phone (e.g., a cellular or other mobile device including a telephony-enabled personal digital assistant), a Voice over Internet Protocol (VoIP)-enabled phone, or a soft phone (i.e., a computer equipped with telephony software).

In this non-limiting example of implementation, the communication device 12 comprises a microphone 40, a speaker 42 (which may be part of an earphone), a network interface 46, and a controller 60.

The microphone 40, the speaker 42, and the network interface 46 are conventionally available components and, as such, need not be described any further. For its part, in this non-limiting embodiment, the controller 60 comprises suitable hardware, firmware, software, control logic, or a combination thereof for implementing a plurality of functional modules, including a communication module 50, a speech recognition module 48 and a control module 54. Functionality of these components of the controller 60 as well as interaction between the various components of the communication device 12 will be described in further detail later on.

As described in further detail below, the communication device 12 enables the user 14 to handle an incoming call or originate an outgoing call using a touch-free approach. The communication device 12 may thus be devoid of any component (e.g. a button or keypad) required to be physically touched by the user 14 in order to handle or originate a call. Nevertheless, standard dialing circuitry (not shown) and ringing circuitry (not shown) may also be provided to handle circumstances where the user 14 desires to handle an incoming call or originate an outgoing call without using the touch-free approach described herein.

With continued reference to FIG. 1, the communication device 12 is connected to a switching/routing entity 20 via a first network portion $24_1$. The first network portion $24_1$ may include a portion of the Public Switched Telephone Network (PSTN), a cellular network, a data network (such as the Internet), or a combination thereof The nature of the first network portion $24_1$ and the switching/routing entity 20 will depend on the nature of the communication device 12, as now described.

For example, where the communication device 12 is implemented as a wired POTS-enabled phone, the first network portion $24_1$ may comprise a telephone line in the PSTN and the switching/routing entity 20 may be part of a central office switch. As another example, where the communication device 12 is implemented as a wireless-enabled phone, the first network portion $24_1$ may comprise a portion of a cellular network (e.g. a wireless link in combination with a base station and a network-side wireline link), and the switching/routing entity 20 may be part of a mobile switching center. As yet another example, where the communication device 12 is implemented as a VoIP-enabled phone (or a POTS-enabled phone equipped with an analog terminal adapter (ATA)), the first network portion $24_1$ may comprise a digital communications link such as Ethernet and the switching/routing entity 20 may be part of an edge router or a softswitch. As yet another example, where the communication device 12 is implemented as a soft phone, the first network portion $24_1$ may comprise a digital communications link such as a DSL link, coaxial cable, etc., and the switching/routing entity 20 may be part of a server equipped with a modem. Still other configurations will be apparent to those skilled in the art.

The switching/routing entity 20 is connected to a second network portion $24_2$ so as to allow the communication device 12 to reach or be reached by any of various communication subsystems, one of which is represented as reference number 28. Other communication subsystems similar to the communication subsystem 28 may also be provided but are not shown for the sake of simplicity. In one non-limiting example scenario, the communication subsystem 28 may be a telephone (e.g. a wired POTS, wireless, VoIP, or soft phone). In another non-limiting example scenario, the communication subsystem 28 may be a voice mail system. Thus, the second network portion $24_2$ may include a portion of the PSTN, a cellular network, a data network (such as the Internet), or a combination thereof that may need to be traversed from the switching/routing entity 20 to the communication subsystem 28.

The switching/routing entity 20 is also communicatively coupled to a controller 22, which is described in detail later on. For now, suffice it to say that, in this non-limiting example, the controller 22 implements a second communication subsystem 29 with which the communication device 12 may communicate via the switching/routing entity 20 and the first network portion $24_1$. In one non-limiting example, the communication subsystem 29 may be an administration subsystem enabling the user 14 to administer, for instance, services provided by the controller 22 and which are subscribed to by the user 14, options associated with such services, billing options, or any other feature associated with interaction between the user 14 and the controller 22.

The switching/routing entity 20 is capable of effecting switching operations to help route an outgoing call from the communication device 12 towards a called party subsystem (such as the communication subsystem 28) via the second network portion $24_2$. In addition, the switching/routing entity 20 is capable of effecting switching operations to help route an incoming call originating at a calling party subsystem (such as the communication subsystem 28), arriving from the second network portion $24_2$, and destined for the communication device 12. Furthermore, the switching/routing entity 20 is capable of effecting switching operations to provide a communication path between the controller 22 and the communication device 12 during outgoing call origination, incoming call handling, and while a call is in progress. Generally, the switching/routing entity 20 may be implemented in hardware, firmware, software, control logic, or a combination thereof.

Figure 2:
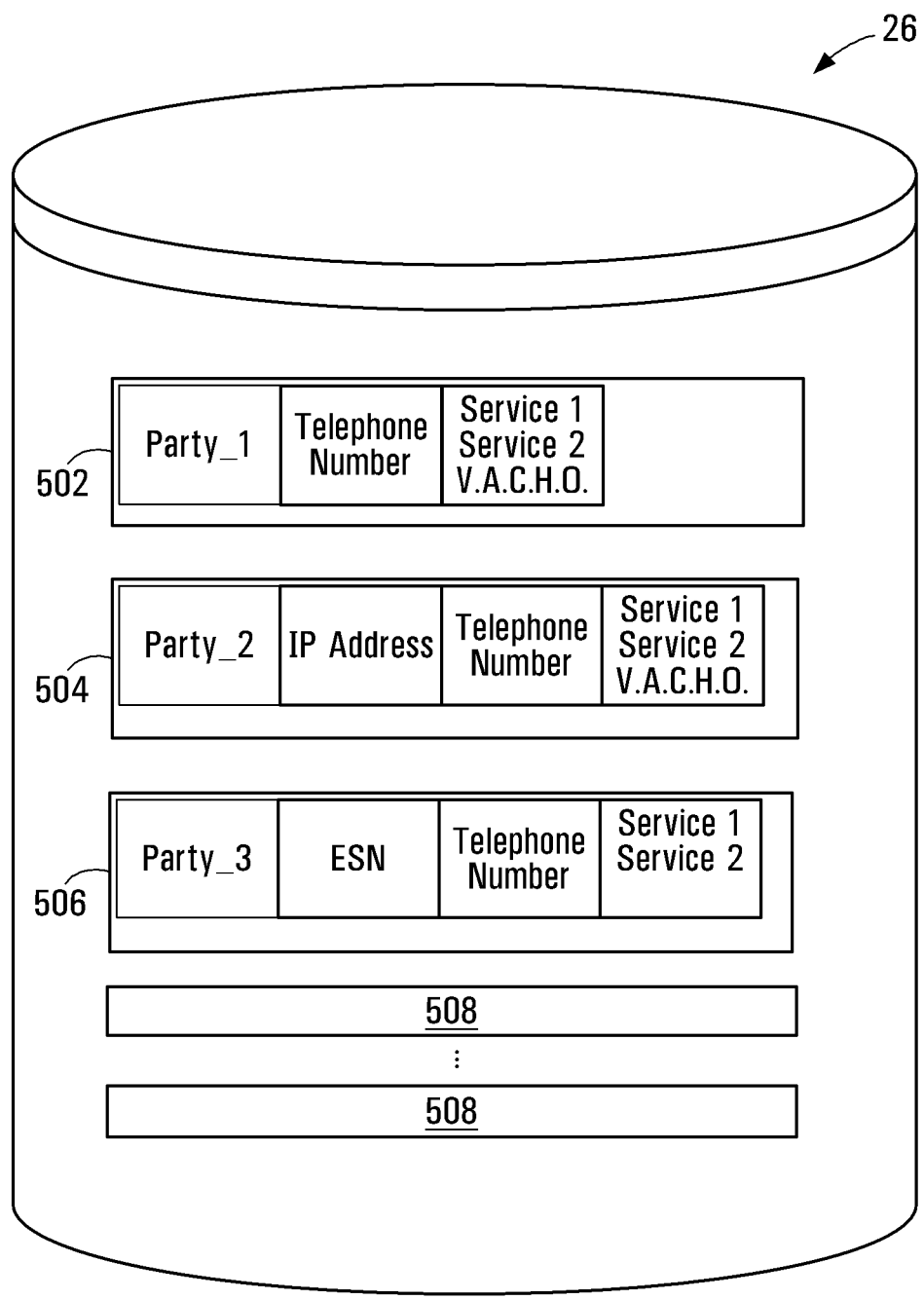
FIG. 2 conceptually illustrates a non-limiting example of potential contents of the database in FIG. 1.

The controller 22 is connected to a database 26, which is now described in further detail with reference to FIG. 2. In this non-limiting example, the database 26 stores a plurality of records 502, 504, 506 and 508, each associated with a respective party (such as the user 14) which may be a potential calling party as well as a potential called party. By way of example, the record 502 stores an association between a party, Party_1, and a telephone number identifying a telephone line expected to be used by Party_1 to originate and handle calls using a wired POTS-enabled phone. The record 504 stores an association between a party, Party_2, and an IP address and associated subscriber telephone number of a VoIP-enabled phone expected to be used by Party_2 to originate and handle calls. The record 506 stores an association between a party, Party_3, and an electronic serial number (ESN) and associated subscriber telephone number of a wireless-enabled phone expected to be used by Party_3 to originate and handle calls. Of course, other forms of content for records in the database 26 are possible, such as where a given party is expected to use a soft phone to effect calls. Accordingly, each of the other records 508 stores an association between a respective party and a communication device expected to be employed by that party to handle and originate calls.

Each of the records 502, 504, 506 and 508 in the database 26 also includes a list of communication services subscribed to by the respective party associated with that record. Examples of conventionally available communication services for outgoing calls include long distance call blocking, calling line identification (CLID) blocking, and so on. For incoming calls, examples of conventionally available communication services include call forwarding, calling line identification (CLID), and so on. In addition, and in accordance with an embodiment of the present invention, the database 26 stores information on whether a particular party subscribes to a "voice-activated call handling and origination" (VACHO) service. In this non-limiting example, Party_1 and Party_2 subscribe to the VACHO service contemplated by the present invention, while Party_3 does not. Of course, subscription to different services may be completely independent from one party to another and the present invention imposes no restriction on the number or combination of services that may be subscribed to by any one party.

With renewed reference to FIG. 1, in one non-limiting embodiment, the switching/routing entity 20, the controller 22, and the database 26 may be located in a common network entity. In other non-limiting embodiments, the switching/routing entity 20, the controller 22, and the database 26 may be located in different network entities.

The controller 22 is operative to interact with the switching/routing entity 20 and the database 26 in order to effect various call control operations when a communication device (such as the communication device 12) connected to the switching/routing entity 20 is the intended recipient of an incoming call, originates an outgoing call, or is involved in a call in progress. In particular, the controller 22 can comprise suitable hardware, firmware, software, control logic, or a combination thereof for implementing a set of functional units for managing various services that may be subscribed to by various parties, including the user 14. Functional units denoted by numerals $34_1 \ldots 34_N$ are associated with conventionally available services 1 through N (e.g., CLID, voice mail, call waiting, call forwarding, automatic call answering, distinctive ringing, long distance call blocking, CLID blocking, etc.). In addition, there is provided a functional unit 30 associated with the VACHO service mentioned. For ease of reference, the functional unit 30 will hereinafter be referred to as a "voice-activated call handling and origination unit" 30 or simply as the VACHO unit 30. In the illustrated non-limiting embodiment, the VACHO unit 30 comprises a set of functional modules, including a communication module 35, a speech recognition module 31 and a control module 38. Functionality of these components of the VACHO unit 30 will be described in further detail below.

As will be seen later on, the VACHO unit 30 contributes to allowing a subscriber to the VACHO service to both handle an incoming call and originate an outgoing call without having to touch his or her communication device, by way of exchange of voice messages with that communication device. This is achieved by the subscriber's communication device being operative to produce signals which capture sound in a vicinity of the communication device and by the VACHO unit 30 being operative to process these signals in an attempt to detect any of various detectable spoken commands which may be contained therein. In response to detecting such a spoken command, the VACHO unit 30 may interact with the subscriber's communication device to effect handling of an incoming call or origination of an outgoing call, as the case may be, in an entirely touch-free manner from the subscriber's perspective.

For illustrative purposes, it is assumed that the user 14 associated with the communication device 12 subscribes to the VACHO service provided by the controller 22. Under this assumption, operation of the controller 22, in particular the VACHO unit 30, and the communication device 12 will now be described in the context of two examples. The first example relates to an incoming call handling process for an incoming call destined for the communication device 12, while the second example relates to an outgoing call origination process for an outgoing call to be originated using the communication device 12.

As envisaged herein, an incoming call handling process for an incoming call destined for a communication device (such as the communication device 12) starts with detection of the incoming call at a network entity (such as the network entity in which is located the controller 22 and/or the switching/routing entity 20). The incoming call handling process may end in many ways such as (i) with acceptance, rejection, or forwarding of the incoming call using the communication device for which the incoming call is destined; (ii) with a calling party (e.g., a calling party using the communication subsystem 28) from which the incoming call originates hanging up; or (iii) with occurrence of any other event resulting in termination of the incoming call handling process.

As also envisaged herein, an outgoing call origination process for an outgoing call to be originated using a communication device (such as the communication device 12) starts with a commitment of a user (such as the user 14) of the communication device to attempt to originate the outgoing call. The outgoing call origination process may end in many ways such as (i) with establishment of the outgoing call via a network entity (such as the network entity in which is located the controller 22 and/or the switching/routing entity 20); (ii) with a network entity determining that it is not capable of completing the outgoing call; or (iii) with occurrence of any other event resulting in termination of the outgoing call origination process.

For both examples presented below, it is assumed that the communication device 12 is initially not involved in either of an incoming call handling process or an outgoing call origination process. Also, for both examples, except as otherwise noted, the microphone 40 of the communication device 12 continuously generates a signal indicative of sound sensed by the microphone 40, this signal being transmitted to the controller 60 of the communication device 12.

1. Incoming Call Handling

Operation of the controller 22 (in particular the VACHO unit 30) and the communication device 12 will now be described in the context of an incoming call originating from the communication subsystem 28, arriving at the switching/routing entity 20 via the second network portion $24_2$ and destined for the communication device 12.

Upon arrival of the incoming call at the switching/routing entity 20, the controller 22 detects the incoming call, which in this example marks the start of the incoming call handling process. The controller 22 determines that the call is destined for the user 14 associated with the communication device 12. This can be determined from destination information that accompanies the incoming call, such as a subscriber telephone number. The controller 22 proceeds to consult the database 26 to determine if the user 14 subscribes to one or more telephony services provided by the controller 22, including, specifically, the VACHO service. In a situation where a given party for which an incoming call is destined does not subscribe to the VACHO service, the controller 22 proceeds to handle the incoming call in a conventional manner. However, as mentioned above, for the purposes of the present example, it is assumed that the user 14 does indeed subscribe to the VACHO service. Having determined that the user 14 subscribes to the VACHO service, the controller 22 passes control over to the VACHO unit 30.

Figure 3A:
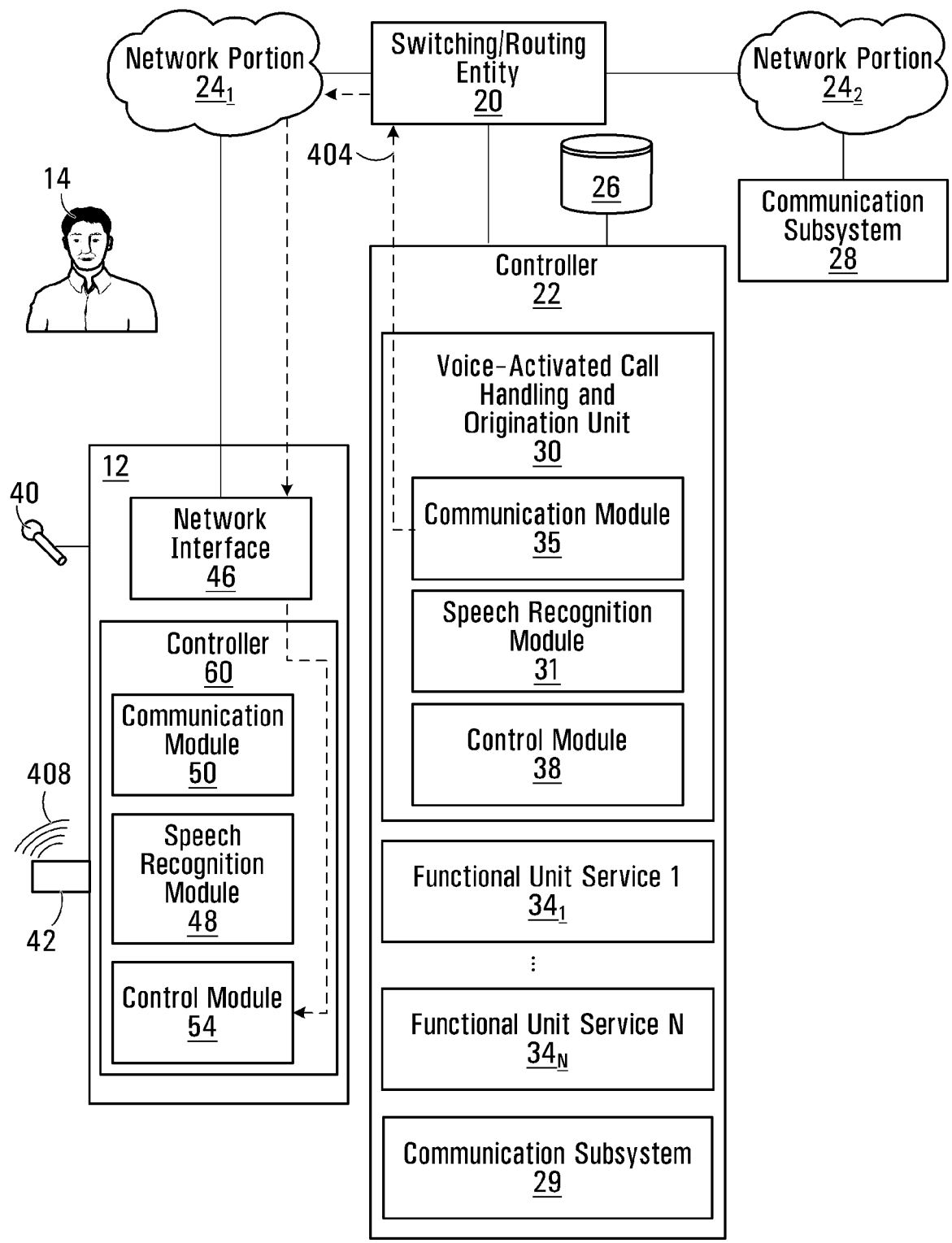
FIGS. 3A and 3B illustrate exchange of signals between various components in the system of FIG. 1 during a touch-free incoming call handling process, in accordance with a non-limiting embodiment of the present invention.
Figure 3B:
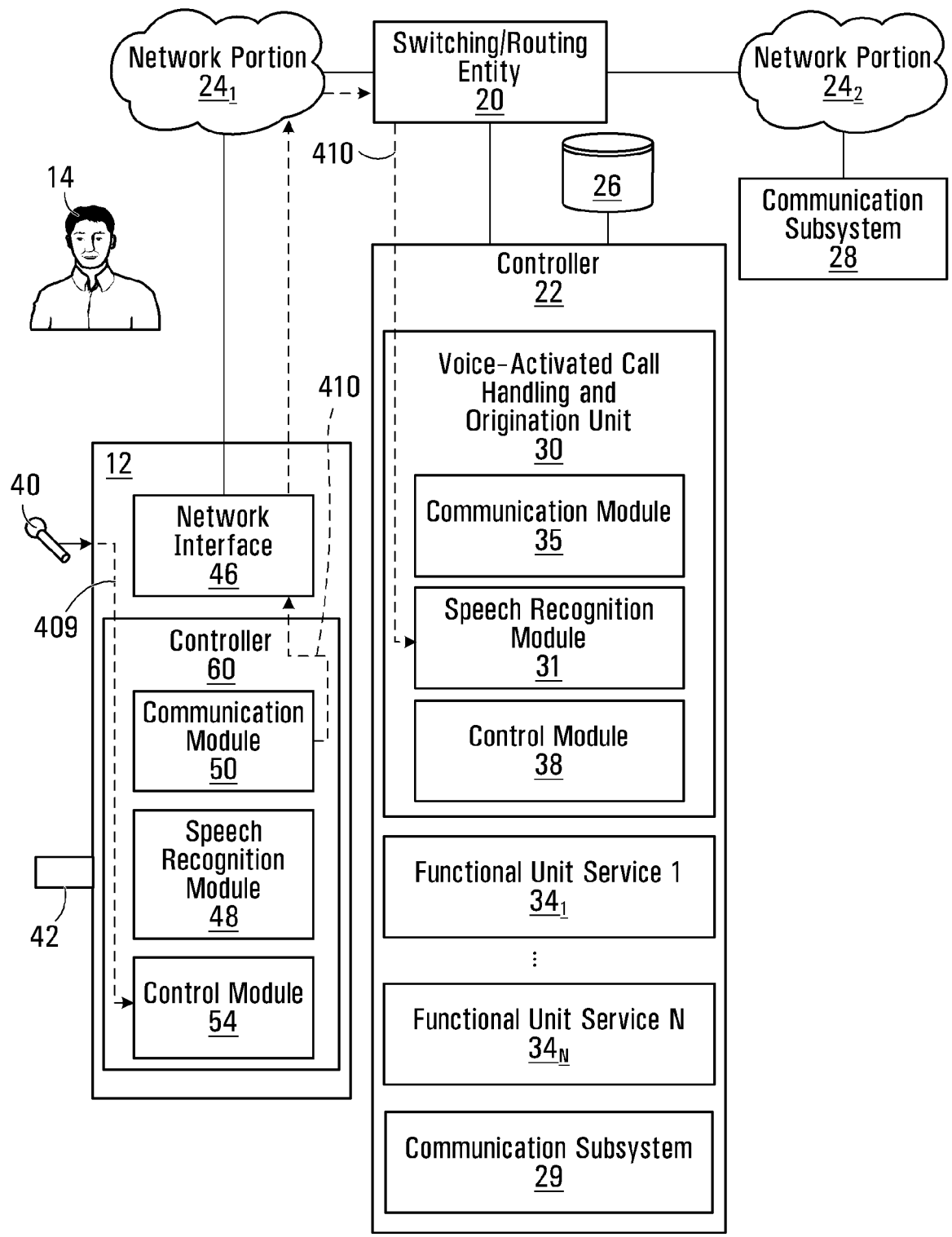
Figure 4:
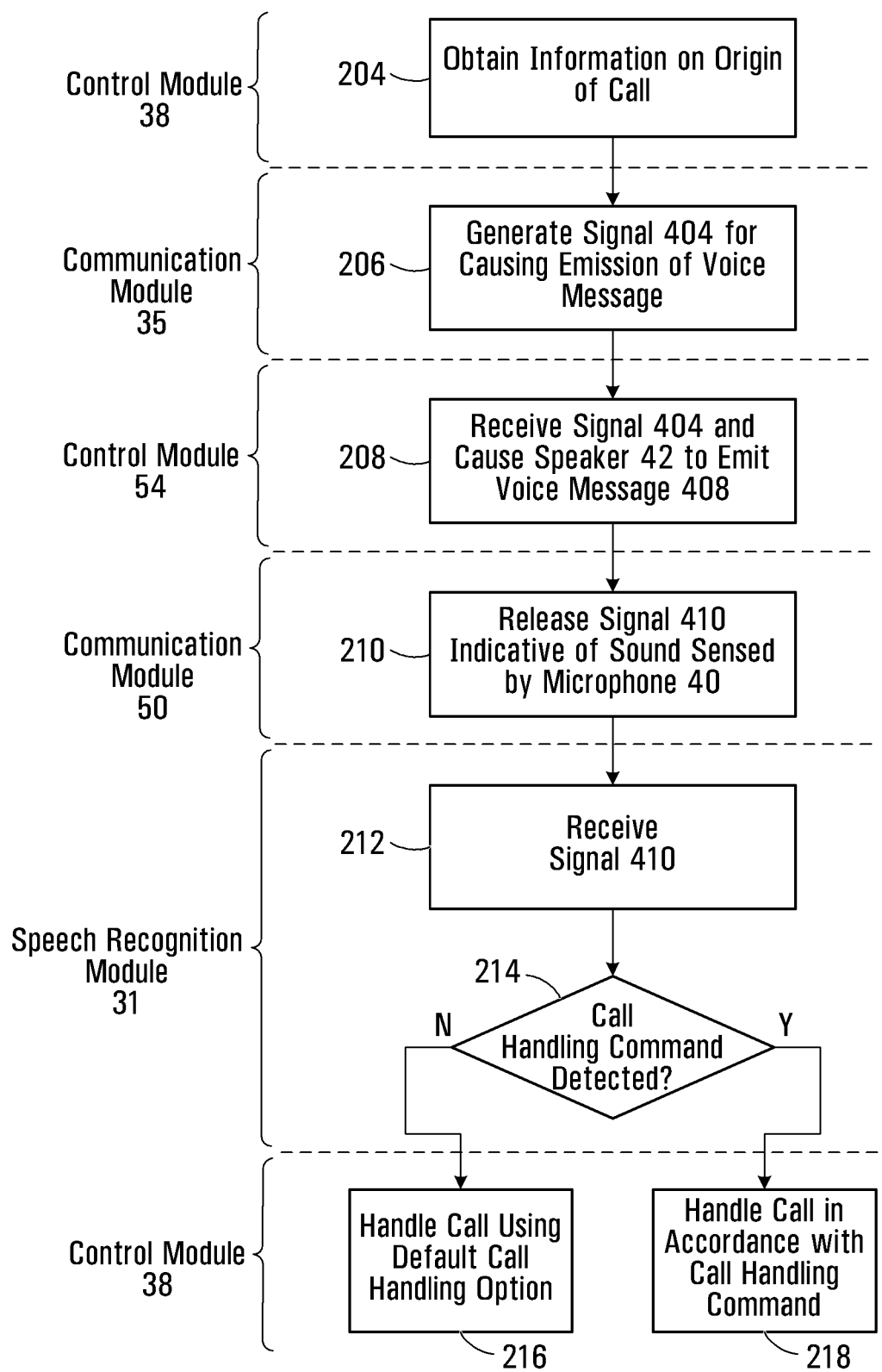
FIG. 4 is a flowchart showing steps performed by various components of the system of FIG. 1 in the context of the non-limiting example of the touch-free incoming call handling process depicted in FIGS. 3A and 3B.

Referring to FIGS. 3A, 3B and 4, there is shown a non-limiting example of operation of the VACHO unit 30 and the communication device 12 further to detection of the incoming call and determination that the user 14 subscribes to the VACHO service. As described in further detail below, the VACHO unit 30 attempts to reach the user 14 by causing the communication device 12 to emit a voice message soliciting a spoken "call handling command" from the user 14. By providing such a spoken call handling command, the user 14 is capable of accepting, rejecting or forwarding the incoming call without being required to touch the communication device 12.

Thus, beginning at step 204, the control module 38 attempts to obtain information regarding an origin of the incoming call. To that end, and in a first non-limiting example embodiment, the control module 38 may use CLID information which may accompany the incoming call. Based on the CLID information, the control module 38 can obtain the identity of an associated calling party. In a second non-limiting example embodiment (not shown), the control module 38 sends a signal back towards the communication subsystem 28 via the second network portion $24_2$ requesting that the identity of the calling party be spoken or otherwise provided. When provided, the identity of the calling party is recorded in a memory (not shown) accessible by the controller 22.

At this stage, the VACHO unit 30 attempts to reach the user 14 over the first network portion $24_1$. Thus, the control module 38 consults the database 26 in order to learn how it should attempt to reach the user 14, e.g., by trying to communicate with the communication device 12 directly, by communicating over a telephone line to which the communication device 12 happens to be connected, etc.

Having determined how it should attempt to reach the user 14 over the first network portion $24_1$, the VACHO unit 30 proceeds to step 206, where the communication module 35 generates a signal 404 and sends the signal 404 over the first network portion $24_1$ towards the communication device 12. In one non-limiting embodiment, the signal 404 is a message that is reproducible at the communication device 12 as an audible voice message. In another non-limiting embodiment, the signal 404 is a trigger that is recognized at the communication device 12 as being associated with an audible voice message for reproduction at the communication device 12. In an embodiment in which the VACHO unit 30 obtained CLID information about the incoming call, generation of the signal 404 may use a text-to-speech conversion algorithm. As a possible alternative, the signal 404 may enable a text-to-speech conversion algorithm implemented at the communication device 12 to emit an audible voice message. In an embodiment in which a voice recording of the name or other identifier of the calling party is available to the VACHO unit 30, generation of the signal 404 may include playing back this recording.

At step 208, the signal 404 (which may have been reformatted by passage through the first network portion $24_1$) is received at the network interface 46 of the communication device 12 and detected by the controller 60. The control module 54 of the controller 60 proceeds to cause the speaker 42 of the communication device 12 to emit a voice message 408. In accordance with an embodiment of the present invention, the voice message 408 is designed to solicit a spoken call handling command from the user 14. In some non-limiting embodiments, depending on the nature of the communication device 12 (e.g., if the communication device 12 is a POTS-enabled phone), the signal 404 may be operable to force the communication device 12 to acquire an off-hook state in order to allow emission of the voice message 408.

Assuming that the calling party has been identified as "John Doe", the voice message 408 may be "You have a call from John Doe. Do you wish to take this call?"; "John Doe is calling. How would you like to handle this call?"; or any conceivable variant thereof The speaker 42 may have volume adjustment capability so that the voice message 408 may be emitted with a volume sufficient to be heard up to several meters. In other cases, for example when the speaker 42 is part of an earphone, volume adjustment may not be required. Of course, the communication device 12 may optionally also emit a ringing sound and/or provide a visual indication (e.g., a blinking light, a text message, etc.) to accompany, precede or follow the voice message 408.

The fact that the voice message 408 can be used to announce the incoming call to the user 14 is beneficial because the user 14 need not take his or her eyes away from what they were doing at the time of arrival of the incoming call. Also, it will be appreciated that when the voice message 408 is emitted, it is still not known whether the user 14 is willing to accept the incoming call, not even whether the user 14 can be reached. Thus, it can be said that the VACHO unit 30 is attempting to reach the user 14, but is at the same time asking for a verbal command as to how to handle the incoming call. The fact that a verbal command can be used by the user 14, if reached, to handle the incoming call is beneficial because the user 14 need not take his or her hands away from what they were doing in order to handle the incoming call, i.e., incoming call handling can be effected in an entirely touch-free manner.

With particular reference now to FIG. 3B, it is recalled that the microphone 40 of the communication device 12 continuously generates a signal indicative of sound sensed by the microphone 40, this signal being transmitted to the controller 60. In order to avoid capturing the voice message 408 in the signal generated by the microphone 40, in one non-limiting embodiment, the control module 54 may temporarily deactivate the microphone 40 during emission of the voice message 408 by the speaker 42 and reactivate the microphone 40 thereafter. In any event, at step 210, upon emission of the voice message 408, the signal generated by the microphone 40 and transmitted to the controller 60 is denoted by numeral 409. The signal 409 causes a signal 410, which may be identical to the signal 409 or an amplified or otherwise processed version of that signal, to be released by the communication module 50 towards the controller 22 via the network interface 46, the first network portion $24_1$, and the switching/routing entity 20. It will be appreciated that the signal 409 and the signal 410 are produced without requiring the communication device 12 to have been touched by the user 14 since detection of the incoming call at the controller 22.

At step 212, the speech recognition module 31 of the VACHO unit 30 receives the signal 410 and, at step 214, processes the signal 410 in an attempt to detect a call handling command which may be contained therein as a result of a spoken response to the voice message 408. To that end, the speech recognition module 31 is adapted to detect several predetermined call handling commands that may be contained in the signal 410. The speech recognition module 31 may employ speaker-dependent or speaker-independent recognition. Data representing the predetermined call handling commands may be stored in a database (not shown) or other memory (not shown) accessible by the controller 22 and specifically the VACHO unit 30.

Non-limiting examples of predetermined call handling commands that may be spoken and detectable by the speech recognition module 31 include:

"yes", "accept" or "hello", associated with a desire of the user 14 to take the incoming call;

"no" or "reject", associated with a desire of the user 14 to not take the incoming call;

"forward to voice mail", associated with a desire of the user 14 to forward the incoming call to a voice mail system; and "forward to alternate number", associated with a desire of the user 14 to forward the incoming call to an alternate telephone number.

Of course, these examples are not to be considered limiting in any respect as various other predetermined call handling commands are possible without departing from the scope of the invention.

If the speech recognition module 31 determines that the signal 410 contains no spoken response whatsoever to the voice message 408 after a predetermined period of time (e.g., 5 to 10 seconds) following emission of that voice message, or if a spoken response provided by the user 14 does not correspond to one of the predetermined call handling commands, then the VACHO unit 30 is deemed not to have detected a call handling command in the signal 410. The control module 38 thus proceeds to step 216 and handles the incoming call in accordance with a default call handling option.

For example, if the calling party is still on the line, the control module 38 may cause emission from the speaker 42 of recurring voice messages each similar or identical to the voice message 408 until the calling party hangs up (which would be detected by the switching/routing entity 20). In another example, if the user 14 subscribes to a voice mail service, then the appropriate one of the functional units $34_1 \ldots 34_N$ of the controller 22 may proceed to automatically forward the incoming call to a voice mail system. In yet another example, if the user 14 subscribes to a call forwarding service, then the appropriate one of the functional units $34_1 \ldots 34_N$ of the controller 22 may proceed to automatically forward the incoming call to a suitable telephone number.

For the purposes of this example, however, it is assumed that the user 14 does provide a spoken response to the voice message 408, which spoken response does correspond to one of the predetermined call handling commands recognizable by the speech recognition module 31. Under these conditions, the control module 38 proceeds to step 218 and handles the incoming call in accordance with the detected call handling command. More specifically, each one of the predetermined call handling commands recognizable by the speech recognition module 31 is associated with a respective action to be performed by the control module 38.

Examples of actions performed by the control module 38 based on the detected call handling command are presented below.

User Accepts Incoming Call

In this example, it is assumed that the spoken response provided by the user 14 is "yes", "accept" or "hello", which indicates a desire of the user 14 to take the incoming call. This can be referred to as a "call acceptance command". In that case, the control module 38 exerts control over the switching/routing entity 20 such that it effects appropriate connections to connect the incoming call to the communication device 12. That is, the control module 38 interacts with the switching/routing entity 20 so that a voice communication path is established between the called party (i.e., the user 14) and the calling party (at the communication subsystem 28). In addition, depending on the nature of the communication device 12, the control module 38 may release a signal towards the communication device 12 to cause the communication device 12 to acquire a state as if the user 14 had actually answered the incoming call in a standard fashion, for example, by lifting a receiver of the communication device 12 or pressing a button thereon.

User Rejects Incoming Call

In this example, it is assumed that the spoken response provided by the user 14 is "no" or "reject", which indicates a desire of the user 14 to not take the incoming call. This can be referred to as a "call rejection command". In that case, since the user's desire to not take the incoming call is known, the control module 38 no longer causes emission of any voice message (and possibly ringing sound) from the speaker 42 to inform the user 14 of the incoming call. In addition, the control module 38 may effectively disregard the incoming call signal being received at the switching/routing entity 20 until this signal is no longer received due to, for instance, the calling party (at the communication subsystem 28) hanging up. As a possible alternative, the control module 38 may generate a signal that is released into the second network portion $24_2$ towards the communication subsystem 28, this signal being intended to indicate to the calling party that the user 14 (i.e. the called party) cannot be reached at this time. As another possible alternative, in a situation where user 14 subscribes to a voice mail service provided by the controller 22 and the VACHO service subscribed to by the user 14 has been configured to forward rejected calls to this voice mail service, the control module 38 may invoke the appropriate one of the functional units $34_1 \ldots 34_N$ in order to allow the calling party to leave a voice mail message for the user 14.

User Forwards Incoming Call

In this example, it is assumed that the spoken response provided by the user 14 is "forward to voice mail", which indicates a desire of the user 14 to forward the incoming call to a voice mail system. This can be referred to as a "call forwarding command". In a case where the user 14 subscribes to a voice mail service provided by the controller 22, the control module 38 proceeds to invoke the appropriate one of the functional units $34_1 \ldots 34_N$ in order to allow the calling party to leave a voice mail message for the user 14.

In a case where the user 14 subscribes to a voice mail service provided by an external entity having a voice mail system and communicatively coupled to the switching/routing entity 20, the control module 38 may exert control over the switching/routing entity 20 such that it effects appropriate connections to forward the incoming call to the external entity's voice mail system.

While in this example the user 14 desired to forward the incoming call to a voice mail system, it will be appreciated that the user 14 may forward the incoming call in accordance with other telephony services to which the user 14 may be subscribed, by providing the appropriate call handling command. For instance, if call forwarding to an alternate telephone number is subscribed to, the user 14 may forward the incoming call to the alternate telephone number by uttering the appropriate call handling command such as "forward to office number" or any other command indicative of the alternate telephone number. In that case, the control module 38 proceeds to invoke the appropriate one of the functional units $34_1 \ldots 34_N$ in order to effect forwarding of the incoming call to the alternate telephone number.

In view of the foregoing, it will be appreciated that, upon detection of the incoming call, the VACHO unit 30 attempts to reach the user 14 by causing the communication device 12 to emit an audible signal soliciting a spoken call handling command from the user 14. By speaking such a call handling command, the user 14 may indicate how he or she desires the incoming call to be handled. From the point of view of the user 14, he or she is able to (1) obtain knowledge about the calling party and (2) indicate how the incoming call is to be handled, without having to undertake any tactile interaction with the communication device 12 and even without looking at a display of the communication device 12. Incoming call handling can thus be effected in a touch-free manner from the perspective of the user 14. From the point of view of network components (e.g., the controller 22, the switching/routing entity 20, the first network portion $24_1$ and the second network portion $24_2$), utilization of bandwidth and other network resources is minimized until the intentions of the user 14 regarding the incoming call are known.

It will also be recognized that it may become advantageous to exploit the fact that the user 14 does not need to physically contact the communication device 12, for purposes of enhancing security.

Accordingly, in a first enhanced security variant, it is assumed that eligibility of the user 14 to handle an incoming call using the VACHO service is established solely on a basis of the user's identity, regardless of the telephone number, IP address, or ESN which may be associated with the communication device 12.

In such a scenario, assuming that the user 14 does provide a spoken call handling command in response to the voice message 408 emitted by the speaker 42 at step 208, then, at step 214, the speech recognition module 31 of the VACHO unit 30 processes the signal 410 and detects the call handling command contained therein, but also effects a biometric signal processing operation. This biometric signal processing operation is intended to verify whether the voice of the user 14 as contained in the signal 410 presents characteristics of one of the subscribers to the VACHO service. To this end, the speech recognition module 31 may consult the database 26 or another memory (not shown) accessible by the speech recognition module 31, which will store biometric indicia (referred to as voice prints) for each subscriber to the VACHO service.

Upon finding a match between the voice of the user 14 as contained in the signal 410 and a voice print of a given subscriber to the VACHO service, the VACHO unit 30 concludes that the user 14 is eligible to handle the incoming call and thus proceeds to handle the incoming call in accordance with the detected call handling command. However, when a match is not found, the VACHO unit 30 may send a signal to the communication device 12 to cause it to emit a message informing the user 14 that he or she may not handle the incoming call or prompting the user 14 to once again provide a spoken utterance to reattempt to find a matching voice print.

In another enhanced security variant, it is within the scope of the present invention to reduce searching time even further by limiting the search for a matching voice print among only those users that are known, a priori, to potentially be associated with the communication device 12 (e.g., by sharing a common residence or by registering with the controller 22, etc.).

The above approaches to enhancing security may be particularly useful to prevent individuals who happen to be in the vicinity of the communication device 12 but are not necessarily allowed or authorized to handle incoming calls, from actually handling such incoming calls. Examples of situations in which this may arise include parents not wanting their children to handle incoming calls (e.g., when the parents are absent); visitors in an office, house or other building which should not be allowed to handle incoming calls; and several proximate subscribers to the VACHO service (e.g., call center agents in a room) not wanting call handling commands spoken by their neighbors to be interpreted as their own.

2. Outgoing Call Origination

Operation of the controller 22 (in particular the VACHO unit 30) and the communication device 12 will now be described in the context of origination of an outgoing call using the communication device 12. The outgoing call to be originated is destined for a called party subsystem which may be, for example, a communication subsystem reachable via the second network portion $24_2$ such as the communication subsystem 28 or the communication subsystem 29 of the controller 22.

As will be seen below, interaction between the communication device 12 and the VACHO unit 30 enables the VACHO unit 30 to process a signal produced by the communication device 12 in an attempt to detect a "call origination command" which may be contained in that signal as a result of an utterance spoken by the user 14. This allows the user 14 to originate an outgoing call without having to physically manipulate the communication device 12.

Figure 5A:
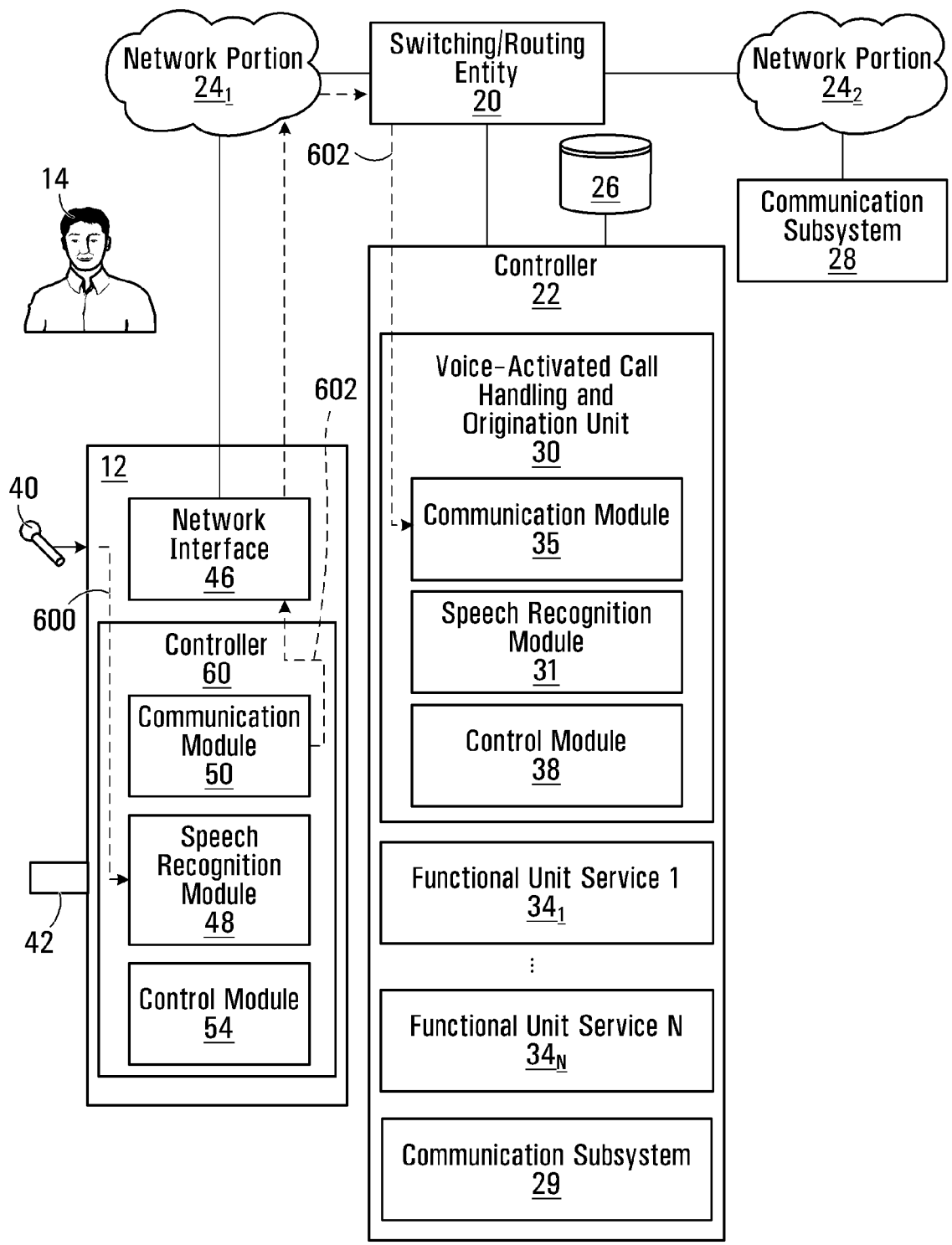
FIGS. 5A and 5B illustrate exchange of signals between various components in the system of FIG. 1 during a touch-free outgoing call origination process, in accordance with a non-limiting embodiment of the present invention.
Figure 5B:
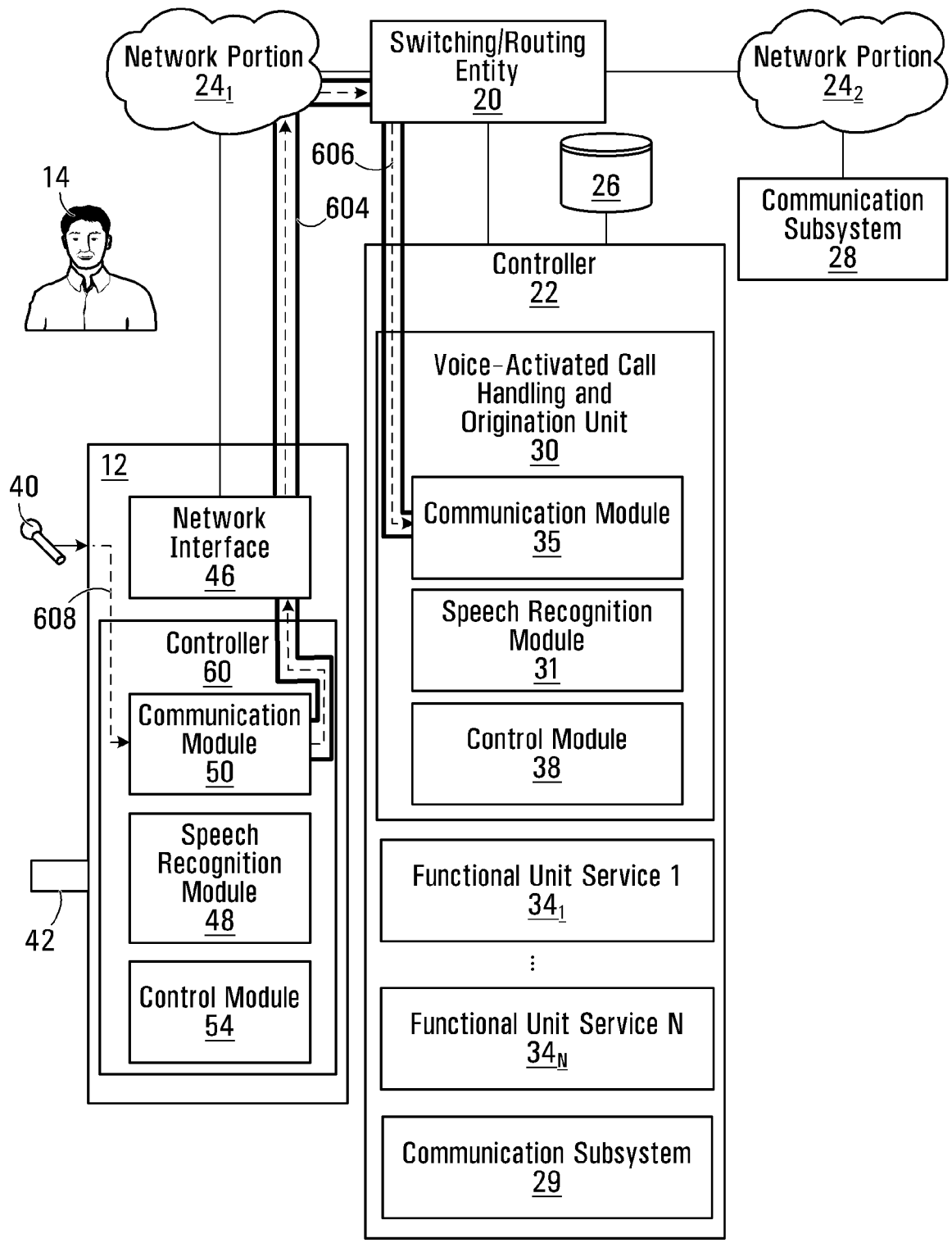

Referring to FIGS. 5A, 5B, 6A and 6B, it is first recalled that the microphone 40 of the communication device 12 continuously generates a signal indicative of sound sensed by the microphone 40, this signal being transmitted to the controller 60. In FIG. 5A, this signal is denoted by numeral 600 and is fed to the speech recognition module 48. In this non-limiting embodiment, in order for touch-free call origination to be effected, the user 14 is required to utter a "detectable" activation command in order to "wake up" (activate) the communication device 12. By "detectable" is meant an activation command that can be detected by the speech recognition module 48, which may employ speaker-dependent or speaker-independent recognition.

An example of a detectable activation command may be the spoken utterance "phone on" or some other utterance that is not expected to be used regularly during ordinary conversation in the vicinity of the communication device 12. In an alternative embodiment, there may be more than one detectable activation command. For example, a set of detectable activation commands may include commands that are intended to activate the communication device 12 in anticipation of a specific call origination activity. Thus, the set of detectable activation commands may include utterances such as "phone on dial out" and "phone on voice mail". Of course, a wide variety of other conceivable variants are within the scope of the present invention.

It will be recognized that, prior to the user 14 uttering a detectable activation command, the user 14 will have made a commitment to attempt to originate the outgoing call. This commitment marks the start of the outgoing call origination process.

Figure 6A:
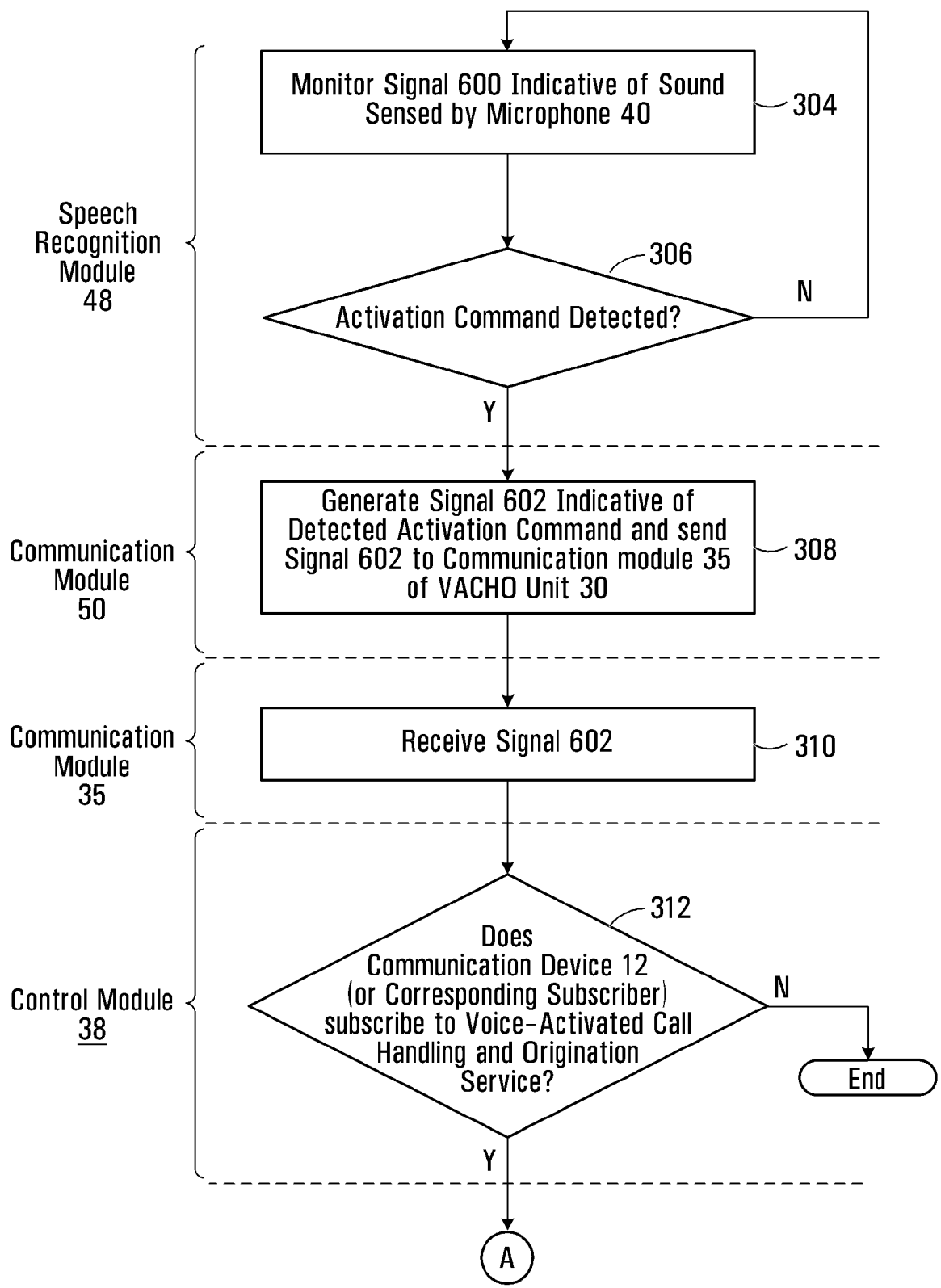
FIGS. 6A and 6B are flowchart showing steps performed by various components of the system of FIG. 1 in the context of the non-limiting example of the touch-free outgoing call origination process depicted in FIGS. 5A and 5B.
Figure 6B:
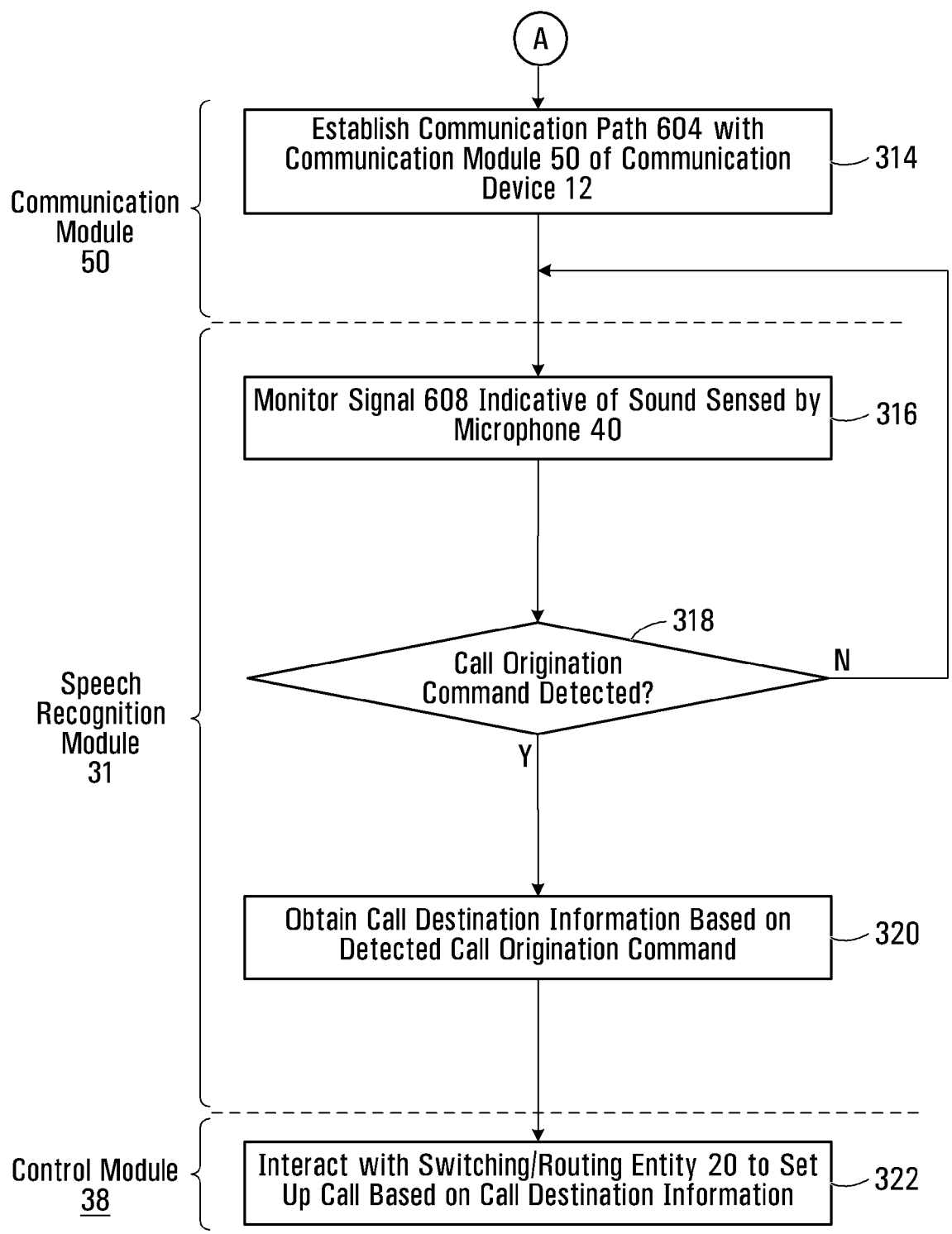

Thus, beginning with step 304 in FIG. 6A, the speech recognition module 48 monitors the signal 600 produced by the microphone 40 and, at step 306, processes the signal 600 in an attempt to detect therein one of the detectable activation commands. In the absence of detection of a detectable activation command, i.e., the "NO" branch of step 306, the speech recognition module 48 returns to step 304 and continues its monitoring process. However, assuming that the user 14 does indeed utter (with sufficient volume) a specific activation command that is in fact a detectable activation command, this specific activation command will be contained in the signal 600 that was produced by the microphone 40 and hence will be detected by the speech recognition module 48. As a result, the "YES" branch of step 306 is taken and the communication module 50 proceeds to execute step 308.

At step 308, a signal 602 indicative of the specific activation command is generated by the communication module 50. The signal 602 is intended to indicate to the VACHO unit 30 that effecting a call origination activity using the communication device 12 appears to be desired. In one non-limiting embodiment, the signal 602 may also include a replica of the signal 600 containing the specific activation command uttered by the user 14. It is noted that the signal 602 is produced with the communication device 12 not having been touched since the commitment of the user 14 to attempt to originate the outgoing call.

The signal 602 is then provided to the VACHO unit 30, specifically to the communication module 35, using a protocol such as SS7 (Signaling System 7), SIP (Session Initiation Protocol), etc., depending on the nature of the communication device 12 and the first network portion $24_1$.

Moving to step 310 in FIG. 6A, the VACHO unit 30, specifically the communication module 35, receives the signal 602 and becomes aware that the user 14 desires to effect a call origination activity using the communication device 12. At this point, eligibility of the user 14 to effect a touch-free call origination activity is still unknown. Thus, at step 312, the control module 38 consults the database 26 to determine whether the user 14 subscribes to the VACHO service. The identity of the user 14 can be learned in various ways based on the signal 602, e.g., by the telephone number of the residence at which the communication device 12 is located (for a wired POTS phone), an IP address of the communication device 12 (for a VoIP phone), an ESN emitted by the communication device 12 (for a wireless phone), etc.

If it would have been determined that the user 14 did not subscribe to the VACHO service, no further action would have to be taken (i.e., the "NO" branch of step 312). However, as mentioned previously, for the purposes of the present example, it is assumed that the user 14 does indeed subscribe to the VACHO service. Having determined that the user 14 does subscribe to the VACHO service (i.e., the "YES" branch of step 312), the communication module 35 of the VACHO unit 30 proceeds to step 314, where it establishes a communication path 604 between itself and the communication module 50 of the communication device 12. Establishment of the communication path 604 can be done using a protocol such as SS7, SIP, etc., depending on the nature of the communication device 12 and the first network portion $24_1$.

The VACHO unit 30 thus knows that an eligible user (in this case the user 14) is accessing the VACHO service and therefore likely desires to effect a call origination activity. In some embodiments, the specific activation command uttered by the user 14 may already contain an indication of the nature of the call origination activity (such as placing a call or accessing a voice mail system), while in other cases (i.e., when it served merely to activate the communication device 12) it may not.

In some cases, it may be advantageous to positively confirm the desire of the user 14 to effect a call origination activity. Thus, optionally, the communication module 35 may send a signal (not shown) to the communication module 50 over the communication path 604. This signal may contain either a confirmation request message or a command to emit a confirmation request message stored locally by the communication device 12. Upon receipt of this signal at the communication module 50, the control module 54 causes the speaker 42 to emit the confirmation request message.

If the user 14 is not satisfied with having triggered the VACHO service, the user 14 can issue a negative confirmation response utterance or can hang up (e.g., by uttering a recognizable "hang up command" such as "phone hang up", "phone off" or the like). The end result is tear-down or disabling of the communication path 604. The details of how to implement a suitable tear-down procedure would be understood by a person skilled in the art and therefore a more detailed explanation is not required.

Assuming, however, that the VACHO unit 30 has reason to believe that the user 14 wishes to continue with the VACHO service (e.g., by the user 14 having responded positively to the confirmation request message, or by not having responded to the confirmation request message, or in the complete absence of a confirmation request message), the communication path 604 is kept alive and will convey the signal that is currently being produced by the microphone 40. However, to avoid confusion with the previous signal 600 that contained the specific activation command, the signal that is currently being produced by the microphone 40 is denoted by the reference numeral 608. It is noted that the signal 608 is produced by the microphone 40 without requiring the communication device 12 to have been touched since the commitment of the user 14 to attempt to originate the outgoing call.

The next step in the process is step 316, which is executed by the speech recognition module 31 of the VACHO unit 30. Specifically, the speech recognition module 31 monitors the signal 608 from the microphone 40 (which may have been reformatted by passage through the first network portion $24_1$) and, at step 318, processes the signal 608 in an attempt to detect therein a call origination command.

One example of a call origination command capable of being detected by the speech recognition module 31 is call destination information (e.g., a telephone number) uttered by the user 14. In one embodiment, the speech recognition module 31 compares each segment of speech to a plurality of recognizable speech segments such as various enunciations of the digits "zero", "one", "two", etc.

Another example of a call origination command capable of being detected by the speech recognition module 31 is a recipient identifier (e.g., "John Smith", "voice mail") uttered by the user 14. As mentioned previously, the speech recognition module 31 may employ speaker-dependent or speaker-independent recognition and thus the speech recognition module 31 may or may not have previously undergone a speech recognition training session with the user 14 to obtain a list of recipient identifiers expected to be used by the user 14. Each recipient identifier is associated with respective call destination information (e.g., a telephone number) that allows proper routing of a call towards its destination, as if the user 14 had himself or herself submitted the call destination information. The association between each recipient identifier and its respective call destination information may be stored in the database 26 or in another memory (not shown) accessible by the speech recognition module 31.

In the absence of detection of a call origination command, i.e., the "NO" branch of step 318, the speech recognition module 31 returns to step 316 and continues its monitoring process. However, assuming that the user 14 does indeed utter (with sufficient volume) a specific call origination command detectable by the speech recognition module 31, this specific call origination command will be contained in the signal 608 that is produced by the microphone 40 and hence will be detected by the speech recognition module 31, i.e., the "YES" branch of step 318 is taken.

At step 320, the speech recognition module 31 extracts the call destination information corresponding to the specific call origination command. It is recalled that the call destination information can be obtained either directly from the user's utterance or indirectly by consulting the database 26 or other memory (not shown) accessible by the speech recognition module 31 after first processing a recipient identifier extracted from the user's utterance.

The control module 38 then proceeds with step 322. Specifically, responsive to obtaining call destination information (e.g. a telephone number) for the outgoing call, the control module 38 exerts control over the switching/routing entity 20 in order to set up the outgoing call as if the telephone number corresponding to the called party subsystem (such as the communication subsystem 28 or the communication subsystem 29) had been dialed by the user 14. In the case where the call is destined for the communication subsystem 28, control exerted on the switching/routing entity 20 may cause initiation of signaling activities with the second network portion $24_2$. Of course, the call may succeed or fail depending on various factors such as network congestion, availability of the called party subsystem, etc.

In view of the foregoing, it can be seen that the communication device 12 and the VACHO unit 30 are capable of cooperating to enable entirely touch-free call origination. From the point of view of the user 14, he or she can originate an outgoing call without the need to lift a receiver, press any buttons, or make any keystrokes, penstrokes, mouse clicks or contact with a touch screen. From a network side perspective, greater processing capabilities and databases are available for speech recognition purposes to effect outgoing call origination for the user 14. Also, by initiating outgoing call origination only after having received an indication that such call origination is desired, one prevents wastage of bandwidth and processing power which would otherwise be needed to listen to communication devices of all subscribers of the VACHO service for potential spoken call origination commands.

It will also be recognized that it may become advantageous to exploit the fact that the user 14 does not need to physically contact the communication device 12, for purposes of enhancing security.

Accordingly, in a first enhanced security variant, it is assumed that eligibility of the user 14 to access the VACHO service is established solely on the basis of the user's identity, regardless of the telephone number, IP address, or ESN which may be associated with the communication device 12. In such a scenario, the signal 602 indicative of the specific activation command that is generated by the communication module 50 and transmitted to the VACHO unit 30 includes a replica of the signal 600 containing the specific activation command uttered by the user 14. In addition, at step 312 in FIG. 6A, rather than having the communication module 35 consult the database 26 to determine whether the user 14 subscribes to the VACHO service, the speech recognition module 31 effects a biometric signal processing operation to verify whether the voice of the user 14 as contained in the replica of the signal 600 presents characteristics of one of the subscribers to the VACHO service. To this end, the speech recognition module 31 may consult the database 26 or another memory (not shown) accessible by the speech recognition module 31, which will store biometric indicia (referred to as voice prints)

for each subscriber to the VACHO service. As a possible alternative to utilizing the signal 602, biometric signal processing to verify the voice of the user 14 may be effected on the signal 608 potentially containing a spoken call origination command.

In another enhanced security variant, it is within the scope of the present invention to reduce searching time even further by limiting the search for a matching voice print among only those users that are known, a priori, to potentially be associated with the communication device 12 (e.g., by sharing a common residence or by registering with the controller 22, etc.).

The various approaches to enhancing security as described above may be particularly useful to protect mobile users from abuse of their subscription to the VACHO service, especially in cases where users tend to migrate from one communication device to another or leave their devices unattended.

Those skilled in the art will appreciate that, in some embodiments, certain portions of the controller 22 and/or the controller 60 may be implemented as pre-programmed hardware or firmware elements (e.g., application specific integrated circuits (ASICs), electrically erasable programmable read-only memories (EEPROMs), etc.), or other related components. In other embodiments, certain portions of the controller 22 and/or the controller 60 may be implemented as an arithmetic and logic unit (ALU) having access to a code memory (not shown) which stores program instructions for the operation of the ALU. The program instructions may be stored on a medium which is fixed, tangible and readable directly by these certain portions of the controller 22 and/or the controller 60 (e.g., removable diskette, CD-ROM, ROM, USB key or fixed disk). Alternatively, the program instructions may be stored remotely but transmittable to these certain portions of the controller 22 and/or the controller 60 via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Although various embodiments have been illustrated, this was for the purpose of describing, but not limiting, the invention. Various modifications will become apparent to those skilled in the art and are within the scope of the present invention, which is defined by the attached claims.

What is claimed is:

1. A method to enable touch-free incoming call handling and touch-free outgoing call origination with a communication device, said method being implemented by a network entity connected to the communication device via a communications network, said method comprising:
    detecting at a first speech recognition module of the communication device a signal indicative of sound sensed by a microphone associated with the communication device from a user of the device, the signal having been produced:
        as part of one of (i) an incoming call handling process associated with an incoming call destined for the communication device; and (ii) an outgoing call origination process associated with an outgoing call to be originated using the communication device; and
        without requiring the communication device to have been touched since a start of said one of the incoming call handling process and the outgoing call origination process;
    receiving the signal at the network entity;
    processing the received signal by a second speech recognition module of the network entity in an attempt to detect at least one of a plurality of spoken commands potentially contained therein, the plurality of spoken commands comprising at least one spoken call handling command and at least one spoken call origination command;
    responsive to detection of a specific one of the at least one spoken call handling command in the received signal, handling the incoming call associated with the incoming call handling process in accordance with the specific spoken call handling command; and
    responsive to detection of a specific one of the at least one spoken call origination command in the received signal, attempting to establish the outgoing call associated with the outgoing call origination process in accordance with the specific spoken call origination command.

2. The method claimed in claim 1, wherein processing the received signal comprises applying speech recognition to the received signal.

3. The method claimed in claim 1, wherein the signal is a first signal and wherein the communication device is associated with a potential user, said method comprising, prior to receiving the first signal at the network entity and if said one of the incoming call handling process and the outgoing call origination process is the incoming call handling process:
    detecting at the network entity arrival of the incoming call destined for the communication device; and
    attempting to reach the potential user by causing the communication device to emit a voice message soliciting a spoken call handling command from the potential user.

4. The method claimed in claim 3, further comprising:
    obtaining information regarding an origin of the incoming call;
    wherein the voice message conveys the information regarding an origin of the incoming call.

5. The method claimed in claim 4, further comprising formulating the voice message by text-to-speech conversion of the information regarding an origin of the incoming call.

6. The method claimed in claim 4, wherein the information regarding an origin of an incoming call is derived from CLID information.

7. The method claimed in claim 4, wherein the information regarding an origin of an incoming call comprises a telephone number.

8. The method claimed in claim 4, wherein the information regarding an origin of an incoming call comprises a name.

9. The method claimed in claim 4, wherein the incoming call originates from a calling party, said method further comprising prompting the calling party to provide the information regarding an origin of the incoming call.

10. The method claimed in claim 3, wherein causing the communication device to emit the voice message comprises sending an electronic signal to the communication device, the electronic signal conveying the voice message.

11. The method claimed in claim 3, wherein causing the communication device to emit the voice message comprises sending a trigger to the communication device to cause the communication device to emit the voice message.

12. The method claimed in claim 3, wherein the incoming call originates from a calling party, and wherein, responsive to (i) detection of a specific one of the at least one spoken call handling command in the first signal and (ii) the specific spoken call handling command being a command to answer the incoming call, said handling the incoming call in accordance with the specific spoken call handling command comprises establishing a voice communication path between the calling party and the potential user.

13. The method claimed in claim 12, further comprising sending a second signal to cause the communication device to acquire a state allowing the voice communication path to be established.

14. The method claimed in claim 3, wherein the incoming call originates from a calling party, and wherein, responsive to (i) detection of a specific one of the at least one spoken call handling command in the first signal and (ii) the specific spoken call handling command being a command to reject the incoming call, said handling the incoming call in accordance with the specific spoken call handling command comprises signaling to the calling party that communication with the potential user cannot be established.

15. The method claimed in claim 3, wherein the incoming call originates from a calling party, and wherein, responsive to (i) detection of a specific one of the at least one spoken call handling command in the first signal and (ii) the specific spoken call handling command being a command to forward the incoming call to an entity other than the potential user, said handling the incoming call in accordance with the specific spoken call handling command comprises establishing a voice communication path between the calling party and the entity other than the potential user.

16. The method claimed in claim 15, wherein the entity other than the potential user is a voice mail system.

17. The method claimed in claim 1, wherein the signal is a first signal and wherein the communication device is associated with a potential user, said method comprising, prior to receiving the first signal at the network entity and if the one of the incoming call handling process and the outgoing call origination process is the outgoing call origination process:
processing at the communication device a second signal indicative of sound sensed by the microphone in an attempt to detect a spoken activation command potentially contained therein; and
responsive to detection of a spoken activation command in the second signal, establishing a communication path between the communication device and the network entity to convey to the network entity the first signal.

18. The method claimed in claim 17, further comprising determining at the network entity an eligibility of a speaker having uttered the spoken activation command to originate calls in a touch-free manner, wherein said establishing a communication path is performed only if the speaker is determined to be eligible to originate calls in a touch-free manner.

19. The method claimed in claim 18, wherein said determining at the network entity an eligibility of a speaker having uttered the spoken activation command to originate calls in a touch-free manner comprises determining whether the speaker is subscribed to a voice-activated call origination service.

20. The method claimed in claim 17, wherein, responsive to detection of a specific one of the at least one spoken call origination command in the first signal and wherein the specific spoken call origination command is spoken by a speaker, said method further comprising performing at the network entity biometric signal processing on the first signal to authenticate the speaker.

21. The method claimed in claim 20, wherein said performing biometric signal processing comprises identifying voice characteristics of the first signal and attempting to identify whether the identified voice characteristics match voice characteristics associated with at least one subscribed user in a database of subscribed users.

22. The method claimed in claim 17, wherein, responsive to detection of a spoken activation command in the second signal and wherein the spoken activation command is spoken by a speaker, said method further comprising conveying to the network entity over the communication path a third signal indicative of sound sensed by the microphone.

23. The method claimed in claim 22, further comprising performing at the network entity biometric signal processing on the third signal to authenticate the speaker of the spoken activation command.

24. The method claimed in claim 23, wherein said performing biometric signal processing comprises identifying voice characteristics of the third signal and attempting to identify whether the identified voice characteristics match voice characteristics associated with at least one subscribed user in a database of subscribed users.

25. The method claimed in claim 22, wherein the third signal has been produced no earlier than the second signal.

26. The method claimed in claim 25, wherein said performing biometric signal processing on the third signal occurs between said processing the second signal at the communication device and said processing the first signal at the network entity.

27. The method claimed in claim 22, wherein the third signal comprises at least a portion of the second signal.

28. The method claimed in claim 24, wherein said processing the first signal at the network entity is performed only if the identified voice characteristics match voice characteristics associated with at least one subscribed user in the database of subscribed users.

29. A system for enabling touch-free incoming call handling and touch-free outgoing call origination using a communication device communicatively coupled to said system via a communications network, said system comprising:
a communication module comprising a first speech recognition module operative for detecting a signal indicative of sound sensed by a microphone associated with the communication device from a user of the device, the signal having been produced:
as part of one of (i) an incoming call handling process associated with an incoming call destined for the communication device; and (ii) an outgoing call origination process associated with an outgoing call to be originated using the communication device; and
without requiring the communication device to have been touched since a start of said one of the incoming call handling process and the outgoing call origination process;
a network entity for receiving the signal, the network entity comprising a second speech recognition module operative for processing the received signal in an attempt to detect at least one of a plurality of spoken commands potentially contained therein, the plurality of spoken commands comprising at least one spoken call handling command and at least one spoken call origination command; and
a control module operative for:
responsive to detection of a specific one of the at least one spoken call handling command in the received signal, causing handling of the incoming call associated with the incoming call handling process in accordance with the specific spoken call handling command; and
responsive to detection of a specific one of the at least one spoken call origination command in the received signal, causing an attempt to establish the outgoing call associated with the outgoing call origination process in accordance with the specific spoken call origination command.

30. The system claimed in claim 29, wherein said second speech recognition module being operative for processing the received signal comprises said second speech recognition module being operative for applying speech recognition to the received signal.

31. The system claimed in claim 29, wherein the signal is a first signal and wherein the communication device is associated with a potential user, said control module being further operative for, prior to reception of the first signal by said communication module and if said one of the incoming call handling process and the outgoing call origination process is the incoming call handling process:
obtaining an indication of detection at a network entity of arrival of the incoming call destined for the communication device; and
attempting to reach the potential user by causing the communication device to emit a voice message soliciting a spoken call handling command from the potential user.

32. The system claimed in claim 31, wherein said control module is further operative for obtaining information regarding an origin of the incoming call, wherein the voice message conveys the information regarding an origin of the incoming call.

33. The system claimed in claim 32, wherein said control module is further operative for formulating the voice message by text-to-speech conversion of the information regarding an origin of the incoming call.

34. The system claimed in claim 32, wherein said control module is operative for deriving the information regarding an origin of an incoming call from CLID information.

35. The system claimed in claim 32, wherein the information regarding an origin of an incoming call comprises a telephone number.

36. The system claimed in claim 32, wherein the information regarding an origin of an incoming call comprises a name.

37. The system claimed in claim 32, wherein the incoming call originates from a calling party, said control module being operative for causing delivery of a prompt to the calling party to provide the information regarding an origin of the incoming call.

38. The system claimed in claim 31, wherein said control module being operative for causing the communication device to emit a voice message comprises said control module being operative for sending an electronic signal to the communication device, the electronic signal conveying the voice message.

39. The system claimed in claim 31, wherein said control module being operative for causing the communication device to emit a voice message comprises said control module being operative for sending a trigger to the communication device to cause the communication device to emit the voice message.

40. The system claimed in claim 31, wherein the incoming call originates from a calling party, and wherein, responsive to (i) detection of a specific one of the at least one spoken call handling command in the first signal and (ii) the specific spoken call handling command being a command to answer the incoming call, said control module being operative for causing handling of the incoming call comprises said control module being operative for causing establishment of a voice communication path between the calling party and the potential user.

41. The system claimed in claim 40, wherein said control module being operative for causing establishment of a voice communication path comprises said control module being operative for sending a second signal to cause the communication device to acquire a state allowing the voice communication path to be established.

42. The system claimed in claim 31, wherein the incoming call originates from a calling party, and wherein, responsive to (i) detection of a specific one of the at least one spoken call handling command in the first signal and (ii) the specific spoken call handling command being a command to reject the incoming call, said control module being operative for causing handling of the incoming call comprises said control module being operative for signaling to the calling party that communication with the potential user cannot be established.

43. The system claimed in claim 31, wherein the incoming call originates from a calling party, and wherein, responsive to (i) detection of a specific one of the at least one spoken call handling command in the first signal and (ii) the specific spoken call handling command being a command to forward the incoming call to an entity other than the potential user, said control module being operative for causing handling of the incoming call comprises said control module being operative for causing establishment of a voice communication path between the calling party and the entity other than the potential user.

44. The system claimed in claim 43, wherein the entity other than the potential user is a voice mail system.

45. The system claimed in claim 29, wherein the signal is a first signal, said communication module being further operative for, prior to reception of the first signal and if said one of the incoming call handling process and the outgoing call origination process is the outgoing call origination process:
receiving a second signal indicative of a desire to effect a call origination activity using the communication device, the second signal having been generated on a basis of sound sensed by the microphone associated with the communication device and containing a spoken activation command; and
establishing a communication path between said system and the communication device for conveyance of the first signal.

46. The system claimed in claim 45, wherein said control module is further operative for determining an eligibility of a speaker having uttered the spoken activation command to originate calls in a touch-free manner, and for enabling said communication module to establish the communication path only if the speaker is determined to be eligible to originate calls in a touch-free manner.

47. The system claimed in claim 46, wherein said control module being operative for determining an eligibility of a speaker having uttered the spoken activation command to originate calls in a touch-free manner comprises said control module being operative for determining whether the speaker is subscribed to a voice-activated call origination service.

48. The system claimed in claim 45, wherein, responsive to detection of a specific one of the at least one spoken call origination command in the first signal, said second speech recognition module is further operative for performing biometric signal processing on the first signal to authenticate a speaker of the specific spoken call origination command.

49. The system claimed in claim 48, wherein said second speech recognition module being operative for performing biometric signal processing comprises said second speech recognition module being operative for identifying voice characteristics of the first signal and attempting to identify whether the identified voice characteristics match voice characteristics associated with at least one subscribed user in a database of subscribed users.

50. The system claimed in claim 45, wherein said communication module is further operative for receiving over the communication path a third signal indicative of sound sensed by the microphone and produced no earlier than the second signal.

51. The system claimed in claim 50, wherein said second speech recognition module is further operative for performing biometric signal processing on the third signal to authenticate a speaker of the spoken activation command.

52. The system claimed in claim 51, wherein said second speech recognition module being operative for performing biometric signal processing comprises said second speech recognition module being operative for identifying voice characteristics of the third signal and attempting to identify whether the identified voice characteristics match voice characteristics associated with at least one subscribed user in a database of subscribed users.

53. The system claimed in claim 50, wherein the third signal comprises at least a portion of the second signal.

54. A non-transitory computer-readable storage medium containing a program element for execution by a functional unit of a network entity to enable touch-free incoming call handling and touch-free outgoing call origination using a communication device communicatively coupled to the network entity via a communications network, the functional unit, when executing said program element, being operative for:
  detecting at a first speech recognition module of the communication device a signal indicative of sound sensed by a microphone associated with the communication device from a user of the device, the signal having been produced:
    as part of one of (i) an incoming call handling process associated with an incoming call destined for the communication device; and (ii) an outgoing call origination process associated with an outgoing call to be originated using the communication device; and
    without requiring the communication device to have been touched since a start of said one of the incoming call handling process and the outgoing call origination process;
  receiving the signal at the network entity;
  processing the received signal by a second speech recognition module of the network entity in an attempt to detect at least one of a plurality of spoken commands potentially contained therein, the plurality of spoken commands comprising at least one spoken call handling command and at least one spoken call origination command; and
  responsive to detection of a specific one of the at least one spoken call handling command in the received signal, causing handling of the incoming call associated with the incoming call handling process in accordance with the specific spoken call handling command; and
  responsive to detection of a specific one of the at least one spoken call origination command in the received signal, causing an attempt to establish the outgoing call associated with the outgoing call origination process in accordance with the specific spoken call origination command.

\* \* \* \* \*